United States Patent

[11] 3,627,864

| [72] | Inventor | Jason G. Doubleday<br>Hampden, Mass. |
|---|---|---|
| [21] | Appl. No. | 867,185 |
| [22] | Filed | Oct. 17, 1969 |
| [45] | Patented | Dec. 14, 1971 |
| [73] | Assignee | Melsur Corporation<br>Brattleboro, Vt.<br>Continuation-in-part of application Ser. No. 388,126, Aug. 7, 1964, now abandoned. This application Oct. 17, 1969, Ser. No. 867,185 |

[54] METHOD OF MOLDING AN ARTICLE
1 Claim, 5 Drawing Figs.

[52] U.S. Cl. .................................................. 264/112
[51] Int. Cl. .................................................. B29j 5/00
[50] Field of Search ........................................... 264/112

[56] References Cited
UNITED STATES PATENTS

| 2,976,577 | 3/1961 | Gould | 161/161 X |
| 3,055,783 | 9/1962 | Hendrickson et al. | 161/43 |
| 3,283,052 | 11/1966 | Munk | 264/248 |
| 3,373,233 | 3/1968 | Rondum | 264/112 |
| 3,423,267 | 1/1969 | Munk | 264/112 |

Primary Examiner—Robert F. White
Assistant Examiner—J. R. Hall
Attorneys—Kenwood Ross and Chester E. Flavin ABSTRACT: A one-operation process for molding a homogeneous article in the form of a core completely covered by an outer protective sheeting which includes the steps of: positioning a first covering thermosetting resin film in the mold below a loading ring, charging a molding material of wood flour and resin into the loading ring and over the first covering film, positioning a second covering thermosetting resin film in the mold and over the charge with the edges thereof extending outwardly of the mold cavity, the first and second covering films unitarily and uniformly surrounding the charge of molding material as an outer protective skin married together at the common joint line adjacent the mold cavity in a core-encompassing manner and married to the core by the application of heat and pressure.

PATENTED DEC 14 1971 3,627,864

INVENTOR.
JASON G. DOUBLEDAY
BY Kenwood Ross &
Chester E. Flavin
ATTORNEYS.

METHOD OF MOLDING AN ARTICLE

CROSS REFERENCE TO RELATED APPLICATION

A continuation in part of Ser. No. 388,126 filed Aug. 7, 1964 now abandoned.

BACKGROUND OF THE INVENTION

1. Field of the Invention

A new concept in sheet or foil molding as applied to desk tops, table tops, chair seats, chair backs, stool tops, panels and the like in that the edges thereof are fully protected with the same material as the finished flat surfaces thereof. The edges of the formed article are, therefore, not subjected to deterioration through use or abuse in service, a serious weakness common to present products of this type.

2. Description of the Prior Art

Historically, the conversion of trees into usable products has long been a notoriously wasteful process. Our wood economy has been one of apparent abundance, undoubtedly engendering the prodigious waste. In the relatively recent past, however, the mountainous sawdust piles and the acrid fumes of the wood refuse burners, long the indignant reminders of our apathy and ineptness, have been disappearing as processing techniques have improved and wood residue utilization has increased.

One method involving the utilization of waster materials has been to form same into pressed board, often called composition board, particle board, or hardboard, with chips, shavings, sawdust and sometimes bark, constituting the basic raw materials.

Particle board is a term which represents reconstituted wood and loosely defines a large number of products prepared from pressed wood constituents and suitable for a wide range of purposes, the wood material being normally mixed with a resin and pressed at high temperature. Here, the type and kind of resin, size and type of wood particles, and the nature of the press operation, have been the principal determinants as respects the resultant properties of the finished end products.

With special reference to such specialized articles as table tops, desk tops, and the like, singularized by surfacing with decorative high pressure melamine resin laminates, their fabrication history reveals revolutionary changes in the more recent past. Originally, the laminate was glued to a pieced solid wood core. Subsequently, as techniques advanced, a plywood core came into acceptance as s substitute for the so-called lumber core. Withal, as to either core type, the quality of the finished product was consistently in doubt, unreasonably wide quality variations being the norm. Further, with either core, the resultant edge characteristics have been generally unsatisfactory, dictating additional costly finishing treatments down the avenues of selected solid wood edgings which have been glued as strips, of self edgings with laminates, or of metal or plastic T-moldings, with such latter all too frequently failing to remain in situ.

The first true particleboards began to appear in the early 1950's, although, even then, some were constituted of no more than glue and sawdust. Some of the early types were as suspect as the solid wood or plywood core type products, and edge treatment became even more of an aggravating problem, due essentially to the normally coarse and varied particle structure. Warpage, delaminating, even total product failure, were commonplace, contributing to agonizingly slow fabricator acceptance.

The impetus continued forward and, eventually, a new type of particleboard began to appear, quite unlike the pioneer glue and sawdust combinations, and constituted by compositions of uniform-sized, fine particles, bonded together with phenolic resins. Of extremely hard density, and with far superior stability and quality, such particleboard formed the basis for new high pressure laminating techniques.

The continuing problem of edge finish treatment dictated the continued use, with conventional cores, of such as a filling, self edging, or inserted T-molding.

No art is known which teaches the principle, in a single operation, of contouring and forming into a coherent structure the so-called external skin portion and a core portion with core and skin portions being secured together by a natural adhering action therebetween to form a unitary formed article and with the skin at the edges being rounded over to provide a smooth noninterrupted edging.

SUMMARY OF THE INVENTION

The invention is specifically exemplified with respect to the use of pulverulent particles of wood flour and hardenable resin as in the production of consolidated bodies, such as table and desk tops and like articles, although it will be recognized from the outset that such illustrations are merely by way of example, countless other types of particles and cooperant binder being conceivable for use within the spirit and scope of the teachings hereof.

The invention allows the creation, in a single molding operation, of a homogeneous piece, or part, consisting of a core of wood flour and resin, covered in part by a protective foil or sheet of a thermosetting resin impregnated alpha paper, or other thermosetting protective foil or sheet.

Proper placement of the foil, or sheet, in relation to proper radii and clearances in the edge area, together with the correct application of heat and pressure and with the proper cure time, allows a charged mass of wood flour and resin and such a foil or sheet to flow and bond together to form a homogeneous piece, or part. That is, as the mass is compressed and bonded together by heat and pressure, the outer protective skin is formed with respect to the core, the protective foil or sheet being sealed and married to the core.

DESCRIPTION OF THE PREFERRED EMBODIMENTS

Figure 1:
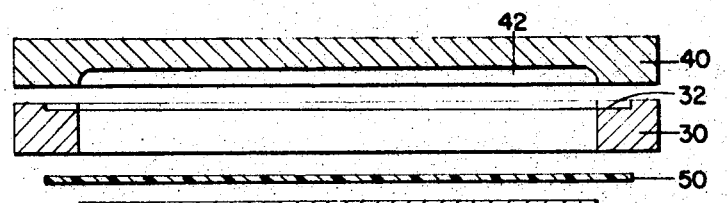
FIG. 1 is a sectional view of a mold employed in the process of the invention and illustrating a first step in the process.

In the disclosure, wood flour is referred to. With respect to the species of wood suitable for the process, most native American wood types, in both hardwood and softwood classifications, are adaptable to molding with resins, when reduced to flakes, particles, or flour. Some of the suitable types, however, are either in limited supply or too costly; other varieties, in more abundant supply, have properties such as to cause difficult production problems, making their employment economically unsound. Generally, in the hardwood classification, the hardwoods subclassified as "soft" or "moderately soft" are the best suited and the flours thereof may be mixed with those varieties of these subclasses which have been further subclassified as "moderately hard" or "hard," these latter varieties for the most part being not considered suitable by themselves. Most ideal "soft" hardwoods include popple (aspen), yellow poplar, cottonwood and basswood, and most ideal "hard" hardwoods include tupelo (gum), birch, sugar maple, and oak (white or red). Contrariwise, in the softwood classification, most, but not all, varieties are well suited to processing, and generally, due to a higher compression ratio, provide better materials for wood/resin molding. Exceptions are such varieties as are high in rosin or pitch content, a group inclusive of most of the southern pine species. A wood, low in or devoid of rosin or pitch, i.e. redwood, while usable, normally will require a much higher percentage of resin for the bonding purpose. Outstanding among the softwoods for processing according to the teachings hereof are the white pines and western (or yellow) pines, best of which is the ponderosa pine, with white fir, douglas fir, and the spruces being suitable.

The wood flour particle size is preferentially from 4 to 20 mesh.

The resin binder is by far the costliest ingredient of the wood flour/resin mixes comprehended. The three basic types, in order of increasing cost, are urea, phenol and melamine formaldehydes. Other thermosetting resins of a specialized nature, such as epoxies, may be utilized in obtaining special purpose end products. Although combinations can be used as binders, certain recommendations for their selection generally apply. Urea is best suited for low cost moldings where moisture resistance is not required. For a given density and resin content, its physical properties are generally lower than those of either phenolic or melamine moldings. Phenolic, on the other hand, is for stronger, more moisture-resistant moldings, the moldings being usually darker in color than the wood component and darkening further upon exposure to sunlight. Melamines, on still another hand, are adapted for colorful moisture-resistant moldings, offering superior surface gloss and hardness. Most expensive of the three, they can be pigmented so as to provide practically any light-stable color.

In the molding composition, the proportions could be from 20 percent resin and 80 percent wood flour up to equal proportions of resin and wood flour depending upon water resistance characteristics, strength characteristics and acid resistance desired.

Further in the disclosure, reference is made to a covering or encapsulating paper employed in connection herewith. The paper used, commonly called "overlay" paper, is used generally by manufacturers making "Formica" type topping for kitchen counters and the like. When made in a thin sheet, it is known as "flint" paper and is used as the decorative part of the dishes in melamine tableware.

In making the paper for purposes of use herewith, a high alpha sheet is used because of the need for purity of the cellulose in the paper to result in a clarity in a final product. In this case, paper of fairly high basis weight, i.e. 35 to 40 pounds per ream, is used to allow pick up of more of the melamine resin during the saturation process.

If the resin used were a thermoplastic and could be extruded in "film form," then no paper would be necessary. Being a thermosetting resin, the making and handling of a film is not practical. Wherefor paper is used as a carrier for the resin. So as not to hurt the clarity of the film, high purity cellulose is used in making the paper.

In saturating or impregnating the paper melamine formaldehyde resin, essentially monomeric, is dissolved in water to the highest concentration possible. The paper is brought in contact with the resin solution by dipping and passing through a trough filled with the resin solution and since twice as much resin as possible in the carrier is wanted, the paper passes over wiping rolls to regulate the surface resin solution.

It then proceeds to a dryer where it is carefully dried so as not to cure the resin. The resin must be left in such a conditions as to allow "flow" of a definite and predetermined degree.

The purchaser of the overlay paper sets the maximum and minimum flow specifications on the paper he purchases.

Many other resins of the thermosetting type are used in like manner for a variety of end uses, resins for example such as
Phenol formaldehyde
Urea formaldehyde
Flurfucal formaldehyde
Sulfonamide formaldehyde
Melamine formaldehyde The melamine resin is preferred as being the hardest and most durable resin in the thermosetting category for the purposes of the invention.

This type of resin is formed by reacting melamine with formaldehyde to yield water, white water or water alcohol solutions of the resins.

Melamine is obtained from either diayandiamide or urea and is considered to have the structural formula:

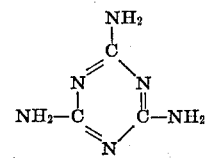

Now with reference to FIGS. 1–6, the employed mold is seen to include a lower cavity plate 10, a force 20, a floatable loading ring 30, and an upper cavity plate 40.

The lower and upper cavity plates 10 and 40 may each be provided with cavities shaped to produce the outer surface of any desired articles. In the drawings, only upper cavity plate 40 is shown as provided with a cavity 42.

The lower and upper cavity plates may be heated to controlled temperatures as by associated steam or heating plates, not shown for purposes of simplification.

Loading ring 30 may be held relative to the cavity plates as by the usual guides (not shown) so that the loading ring may be positioned and held in alignment relative to the cavity or cavities of the cavity plate or plates.

The upper surface of loading ring 30 is provided with a slight recess or depression 32 which, as will be seen, is adapted to receive the ends or edges of the thermosetting protective foil or sheet.

In the first step of the process a lower sheet 50 is placed upwardly of and centrally of force 20 and below and centrally of loading ring 30, as shown in FIG. 1. This sheet preferably is a single composite sheet of paper having a high resin content to allow fusion of the paper to the body of the being-formed article. Additionally, such resin constituent provides an increased degree of wearability on the surface of the end product. Preferentially, the sheet is of a thermosetting melamine impregnated alpha paper or other thermosetting type. This sheet can be made in various colors and has a good color retention. It has good resistance to wear and scratching and is capable of being deep-drawn. It has good resistance to aging, good bonding properties, and forms a good surface material. It may be used in various thicknesses, for example, 99/1000 inch.

Figure 2:
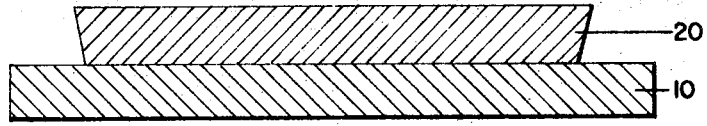
FIG. 2 is a view, generally similar to FIG. 1, illustrating a second step in the process.

Force 20 is then motivated upwardly, as shown in FIG. 2, so as to effect a shearing of sheet 50 at the edges when and as the force moves toward the loading ring.

Figure 3:
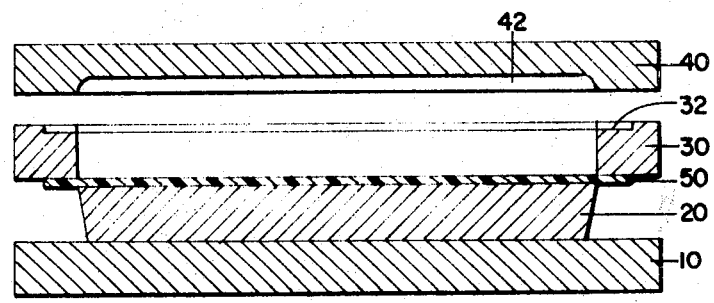
FIG. 3 is a view, generally similar to FIG. 1, illustrating a third step in the process.

The force, as shown in FIG. 3, is caused to enter the loading ring slightly so as to define a well into which the wood flour 70 may then be charged.

The charge is then leveled with respect to the upper surface of the loading ring.

Figure 4:
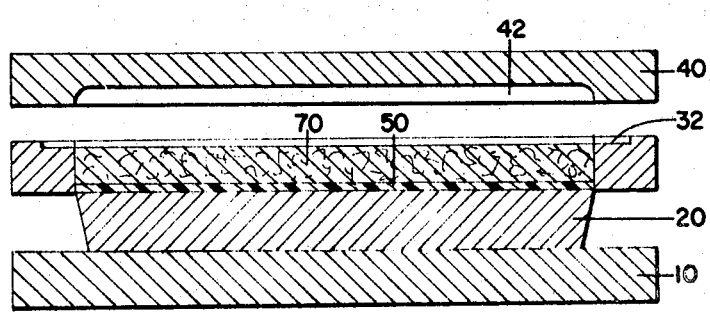
FIG. 4 is a view, generally similar to FIG. 1, illustrating a fourth step in the process.
Figure 5:
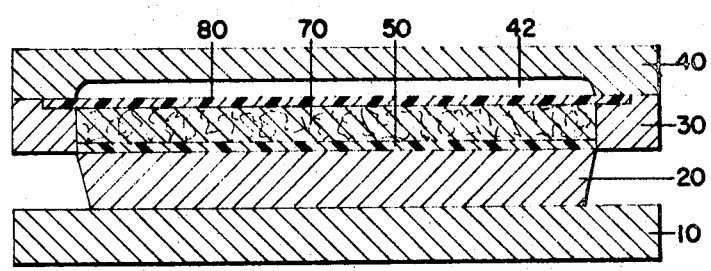
FIG. 5 is a view, generally similar to FIG. 1, illustrating a fifth step in the process.

Then, as shown in FIG. 4, another sheet 80 is placed thereover.

Force 20 may then be activated or forced into mold cavity 42 for the molding operation by any suitable means such as a conventional hydraulic means whereby the press is closed and pressure and heat applied depending upon density of part to be formed, with pressure being in the range of from 1,000 to 1,500 p.s.i. and heat being in the range of from 270° to 310° F. wherewith to produce a density ranging from 44 to 88 lbs. per cu. ft.

The article is then cured for a desired time, such as from 8½ to 12 minutes, depending upon product thickness. The press or mold is then opened and the formed article removed such as by rubber suction cups or other method.

The free edges or ends of the sheet may then be trimmed off, and the edges buffed.

Let it here be reiterated that the methods and apparatus hereof are adaptable for used with particle mixtures other than those of the wood flour types and comprehend particles of other commonly used cellulose or mineral products having capacities, when compressed, for fusing together into permanently compacted masses.

It may be here interjected that the surface decorative treatment may take one of several forms.

For example, one such method envisions a technique which simplifies the decorative aspect of the program by reducing the application of resin-impregnated papers to a single sheet. Albeit, a simplified step of the procedure, a full color range of pattern is realizable with resultant surfaces meeting, even surpassing, applicable specifications. Herewith, decorative surfaces of exceptional clarity and depth can be achieved which are possessive of excellent color rendition and which, with respect to woodgrain, are inconceivably realistic.

One technique may be based on a reverse printing of the pattern or wood grain directly on the paper itself so that the printing, after lamination, is on the underside of a transparent overlay, with the pigmented fine wood flour/resin substrata serving as the basic ground-color. With the ground-color material making up the edge of the finished unit, a totally complementary effect is achieved. One of the two key requirements of such decorative method is in the printing of the overlay. Early, single color, prints lacked sufficient tone rendition and contrast. Later multiple color process printings proved more effective. Today, any pattern or wood grain normally printed on regular opaque papers can be reproduced on overlay papers with dramatic results. The other key requirement relates to the quality of the substrata material, it being essential that the substrata material be of extremely uniform color and texture and of suitably high melamine resin content to provide for the required strength, hardness and impact resistance.

I claim:

1. A process of molding an article consisting of a core of wood flour and resin completely covered by protective sheets bonded to said core, comprising:
   a. positioning a first sheet of a melamine impregnated thermosetting paper on the upper surface of a lower mold cavity element by motivating said lower mold cavity element upwardly and into a surrounding loading ring to define a well therein and to shear said first sheet and form a bottom covering of said first sheet within said well,
   b. charging a mixture of wood flour and uncured thermosetting resin into said well over said first sheet,
   c. placing a second melamine impregnated thermosetting paper sheet over said loading ring and said wood flour-resin mixture therein,
   d. motivating said lower mold element and an upper mold element having a cavity therein into a mold closed position under a pressure of 1,000–1,500 p.s.i. and a temperature of 270°–310° F. to shape said upper sheet, to compress said mixture to a desired thickness and to bond said sheets to said compressed mixture and to each other at the edges thereof to completely cover said compressed mixture, and
   e. curing said mixture and sheets within said mold elements and removing said molded articles.

* * * * *